United States Patent [19]

Kawai

[11] Patent Number: 5,215,324
[45] Date of Patent: Jun. 1, 1993

[54] REMOVAL PREVENTING MECHANISM FOR BICYCLE HUB ASSEMBLY

[75] Inventor: Mamoru Kawai, Matsumoto, Japan

[73] Assignee: Sansin Engineering, Inc., Nagano, Japan

[21] Appl. No.: 786,178

[22] Filed: Oct. 31, 1991

[30] Foreign Application Priority Data

Jan. 8, 1991 [JP] Japan .................................. 3-12850

[51] Int. Cl.⁵ .............................................. B62K 19/30
[52] U.S. Cl. .................................... 280/279; 280/288; 301/111; 301/124.2
[58] Field of Search ................ 301/105 R, 105 B, 111, 301/105.1, 110.5; 280/279, 281.1, 284, 285, 286, 288

[56] References Cited

U.S. PATENT DOCUMENTS

| 1,387,215 | 8/1921 | Wagner ................................. 280/279 |
| 3,807,761 | 4/1974 | Brilando et al. ..................... 280/279 |
| 4,805,941 | 2/1989 | Downing et al. ............... 280/288 X |
| 4,906,053 | 3/1990 | Kawai .............................. 301/110.5 |
| 5,058,913 | 10/1991 | LaRiviere et al. ............. 280/288 X |

FOREIGN PATENT DOCUMENTS

57-12301  1/1982  Japan .
62-127004 8/1987  Japan .

*Primary Examiner*—Russell D. Stormer
*Attorney, Agent, or Firm*—William H. Eilberg

[57] ABSTRACT

A removal preventing mechanism for preventing unexpected removal of a bicycle hub assembly comprises a latch member pivotally mounted to each fork end having a hub mounting cutout which receives a hub shaft. The latch member is pivotable between a locking position for preventing removal movement of the hub shaft from the hub mounting cutout of the fork end and an unlocking position for allowing movement of the hub shaft from and into the hub mounting cutout. The latch member is normally urged to the locking position by a spring.

16 Claims, 9 Drawing Sheets

REMOVAL PREVENTING MECHANISM FOR BICYCLE HUB ASSEMBLY

BACKGROUND OF THE INVENTION

1. Field of the Invention

This invention relates to a removal preventing mechanism for a bicycle hub assembly More specifically, the invention relates to a removal preventing mechanism for preventing unexpected removal of a hub assembly, particularly a quick-release type hub assembly, from the bicycle fork ends during running.

2. Description of the Prior Art

In bicycles, generally, it is often required to remove a hub assembly from a pair of fork ends of a bicycle frame for repair or replacement for example. For this purpose, Japanese Utility Model Application Laid-open No. 57-12301 (Laid-open: Jan. 22, 1982; Inventor: Keizo SHIMANO) discloses a quick-release type clamping assembly for a bicycle hub assembly which enables quick removal of the hub assembly when required.

More particularly, the clamping assembly of the above laid-open utility model application comprises a tie rod extending through a hollow hub shaft on which is rotatably supported a hub shell between a pair of fork ends. The tie rod has one end screwed to an adjusting end nut positioned axially outwardly from one fork end. The other end of the tie rod is provided with an enlarged head positioned axially outwardly from the other fork end and having a cam hole extending transversely of the rod. A hollow presser member is fitted around the enlarged head and axially movable relative thereto toward and away from the end nut. A lever, which is pivotable about a pivotal axis between a clamping position and a releasing position, is mounted to the presser member and has a cam portion received within the cam hole and eccentric relative to the pivotal axis.

When the lever is pivoted to the clamping position, the presser member is moved axially inwardly toward the end nut due to the eccentricity of the cam portion. As a result, the distance between the end nut and the presser member is reduced to clam the hub assembly to the fork ends.

Conversely, when the lever is pivoted to the releasing position, the presser member is moved axially outwardly away from the end nut, so that the hub assembly and the fork ends are relieved from the previous clamping force to enable removal of the hub assembly from the fork ends.

As described above, the quick-release type clamping assembly has an advantage of enabling quick mounting and removal of the hub. However, in such a clamping assembly, it is necessary to properly adjust the clamping force by previously selecting the initial axial position of the adjusting end nut on the tie rod. If this initial adjustment is improper, the clamping force may be insufficient for firmly clamping the hub assembly to the fork ends. Therefore, the hub assembly together with the wheel thereon may unexpectedly come off the fork ends during riding.

The problem of unexpected removal of the hub assembly is particularly serious with respect to off-road bicycles (often referred to as "mountain bicycles") which are designed to run on severely rough grounds. In such a bicycle, great shocks and vibrations frequently applied to the hub assembly causes loosening of the clamping assembly, thereby leading to unexpected removal of the hub assembly. Further, it is highly likely in the mountain bicycle that the lever of the quick-release type clamping assembly may come into accidental contact with an external object, so that the lever may be pivoted in the releasing direction to allow removal of the hub assembly.

In view of the above problem, the applicant has previously proposed two different solutions for preventing unexpected removal of the hub assembly from the bicycle fork ends. A first solution is disclosed in Japanese Utility Model Application Laid-open No. 62-127004 (Laid-open: Aug. 12, 1987), whereas a second solution is disclosed in disclosed in U.S. Pat. No. 4,906,053 issued on Mar. 6, 1990.

According to the first solution, use is made of a stopper washer which is fitted on the tie rod of the quick-release type clamping assembly (having the same structure as already described). The stopper washer has an engaging pawl which is made to engage a suitable portion of a fork end, so that the hub assembly associated with the clamping assembly is prevented from unexpected removal by the stopper washer engaging the fork end.

However, the first solution, while effective for preventing unexpected removal of the hub assembly, is defective in that the stopper washer must be angularly adjusted to engage a suitable portion of the fork end at the time of mounting and re-mounting the hub assembly relative to the fork end. Obviously, the necessity for angular adjustment detracts much from the quick operability of the quick-release type clamping assembly.

The second solution utilizes a cap-shaped hub stopper which is fitted around the adjusting end nut of the quick-release type clamping assembly. The hub stopper is slidably movable on the end nut axially of the hub assembly between a first position for surrounding engagement with a fork end and a second position for disengaging from the fork end. The hub stopper is held in a selected one of the first and second positions by locking means.

The second solution, while also effective for preventing unexpected removal of the hub assembly, is defective in that the adjusting nut must be re-designed in configuration to enable slidable fitting of the hub stopper and mounting of the locking means for the hub stopper. Further, the second solution is also disadvantageous in that a similar hub stopper cannot be arranged on the presser member of the quick-release type clamping assembly because the presence of the lever prohibits or restricts slidable fitting of the hub stopper onto the presser member.

SUMMARY OF THE INVENTION

It is, therefore, an object of the invention to provide a removal preventing mechanism for a bicycle hub assembly which can be mounted to the existing fork ends of the bicycle without modification for reliably preventing unexpected removal of the hub assembly.

Another object of the present invention is to provide a removal preventing mechanism for a bicycle hub assembly which, while reliably preventing unexpected removal of the hub assembly, enables ready removal and re-mounting of the hub assembly when such becomes necessary.

According to the invention, there is provided a removal preventing mechanism for preventing unexpected removal of a bicycle hub assembly from a pair of fork ends each having a hub mounting cutout, the hub assembly including a hub shaft which is received in the hub mounting cutout of each fork end, the removal preventing mechanism comprising: a latch member pivotally mounted to at least one fork end, the latch member being pivotable between a locking position for preventing removal movement of the hub shaft from the hub mounting cutout of said one fork end and an unlocking position for allowing movement of the hub shaft from and into the hub mounting cutout of said fork end; and biasing means for normally urging the latch member to the locking position.

Normally, each fork end of existing bicycles has one or more threaded holes for fixing a luggage carrier leg and/or a mudguard support leg for example. However, for sports-type bicycles such as racing bicycles or mountain bicycles, the luggage carrier or mudguard is unnecessary in nature (for weight reduction for example), so that the threaded holes of the fork end are left unused.

According to the present invention, the latch member may be pivotally mounted to the fork end by utilizing one of the fork end threaded holes which has been left unused for a luggage carrier leg for example. Thus, no modification is necessary with respect to the fork end itself. Further, since the latch member is pivotally mounted to the fork end but not an adjusting end nut of a quick-release type clamping assembly for the hub assembly, the clamping assembly itself need not be modified for mounting of the removal preventing mechanism.

Moreover, since the latch member may be pivoted to the unlocking position, the hub assembly can be readily removed from the fork end when such is necessary. In addition, the latch member is spontaneously pivoted to the locking position by the action of the biasing means, so that mounting and re-mounting of the hub assembly can be performed very easily.

According to a preferred embodiment of the present invention, the latch member has a cam edge which interacts with the hub shaft for forcibly pivoting the latch member out of the locking position when the hub shaft enters into the hub mounting cutout of the fork end. Such an arrangement additionally facilitates mounting and re-mounting of the hub assembly.

Preferably, the latch member is provided with an operating portion which is used for manually pivoting the latch member to the unlocking position against the action of the biasing means. Obviously, this arrangement further facilitates removal of the hub assembly.

Other objects, features and advantages of the present invention will be fully understood from the following detailed description given with reference to the accompanying drawings.

DETAILED DESCRIPTION

Throughout the accompanying drawings, like parts are referred to by the same reference numerals and characters.

Figure 1:
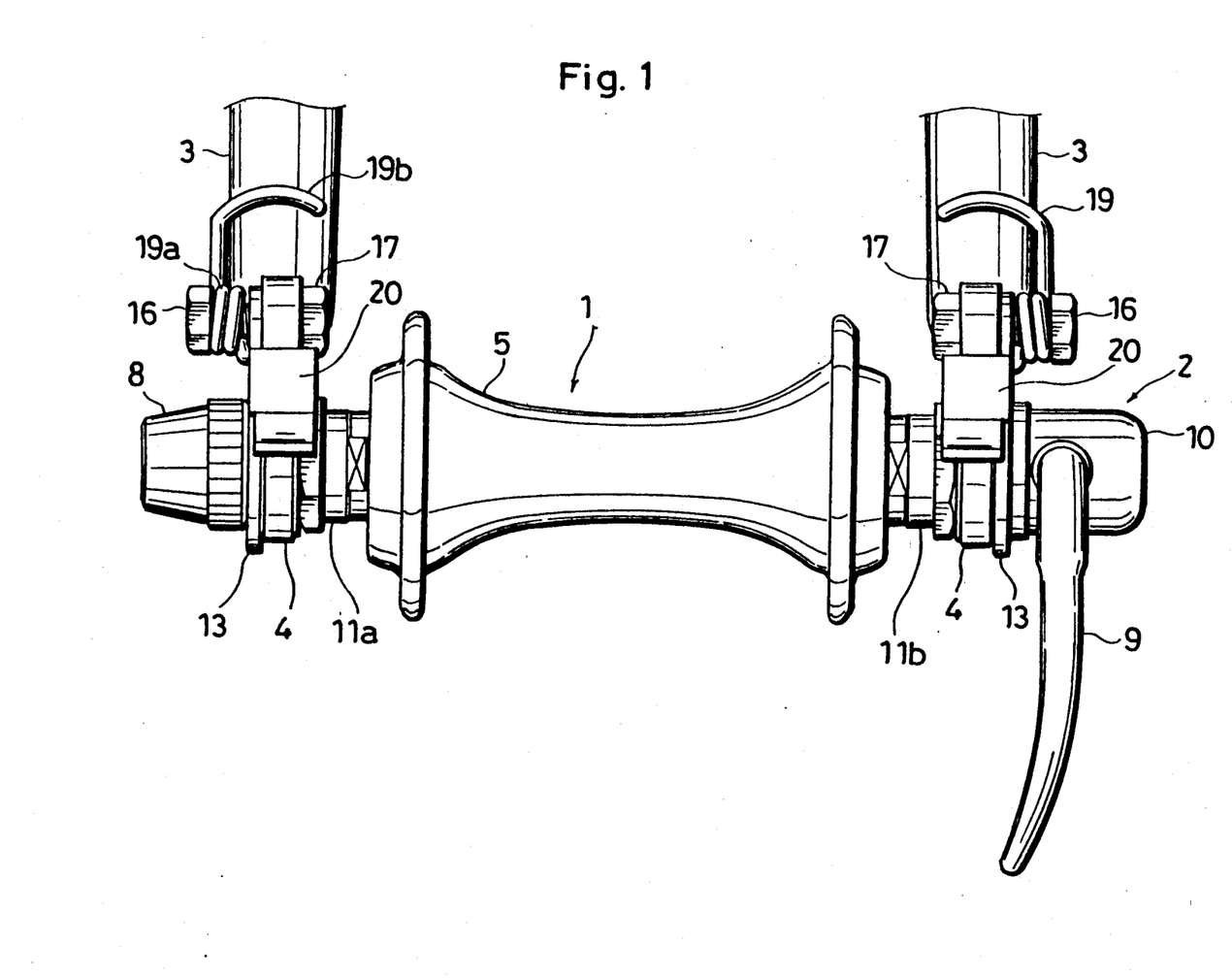
FIG. 1 is a front view showing the entirety of a hub assembly with a removal preventing mechanism according to the present invention.

Referring first to FIG. 1, there is illustrated a hub assembly 1 which is prevented from unexpected removal by a removal preventing mechanism according to the present invention The hub assembly 1 is removably fixed to the respective ends (fork ends) 4 of bicycle front or rear forks 3 by means of a quick-release type clamping assembly 2.

Figure 2:
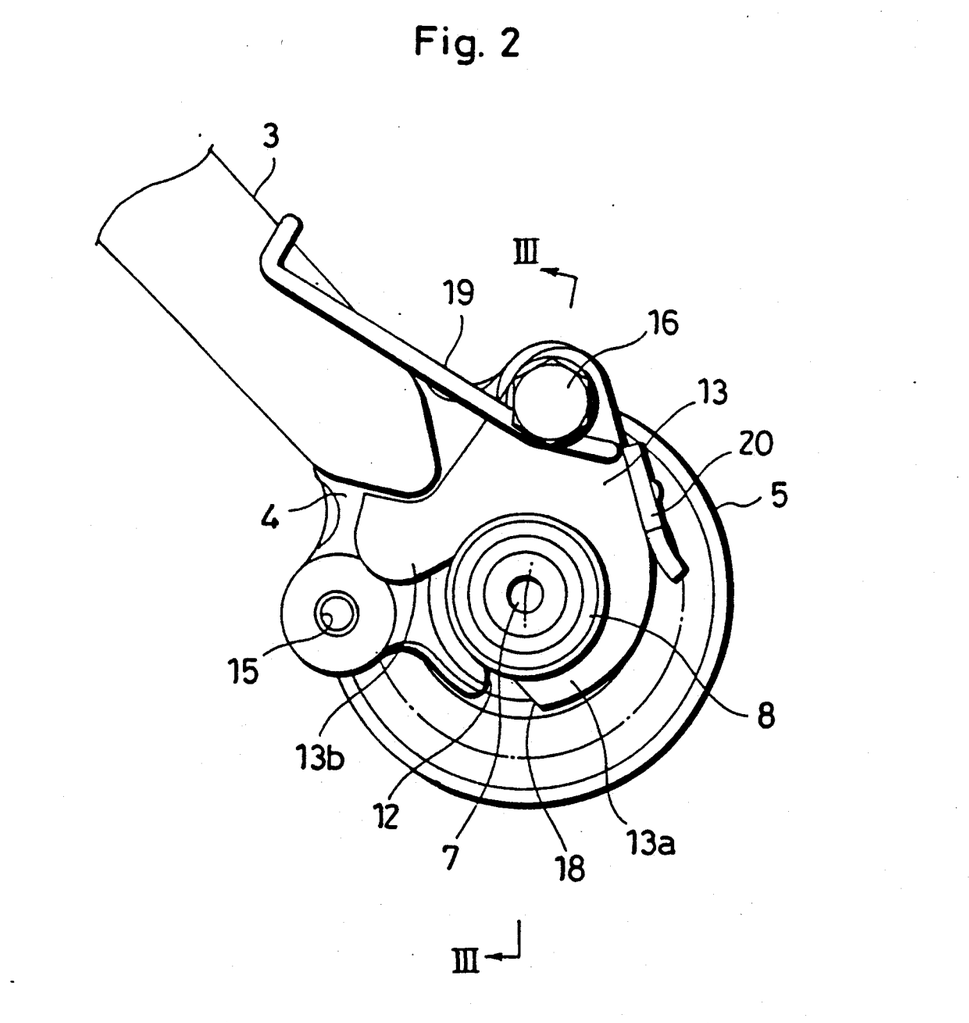
FIG. 2 is a side view showing the hub assembly and the removal preventing mechanism.
Figure 3:
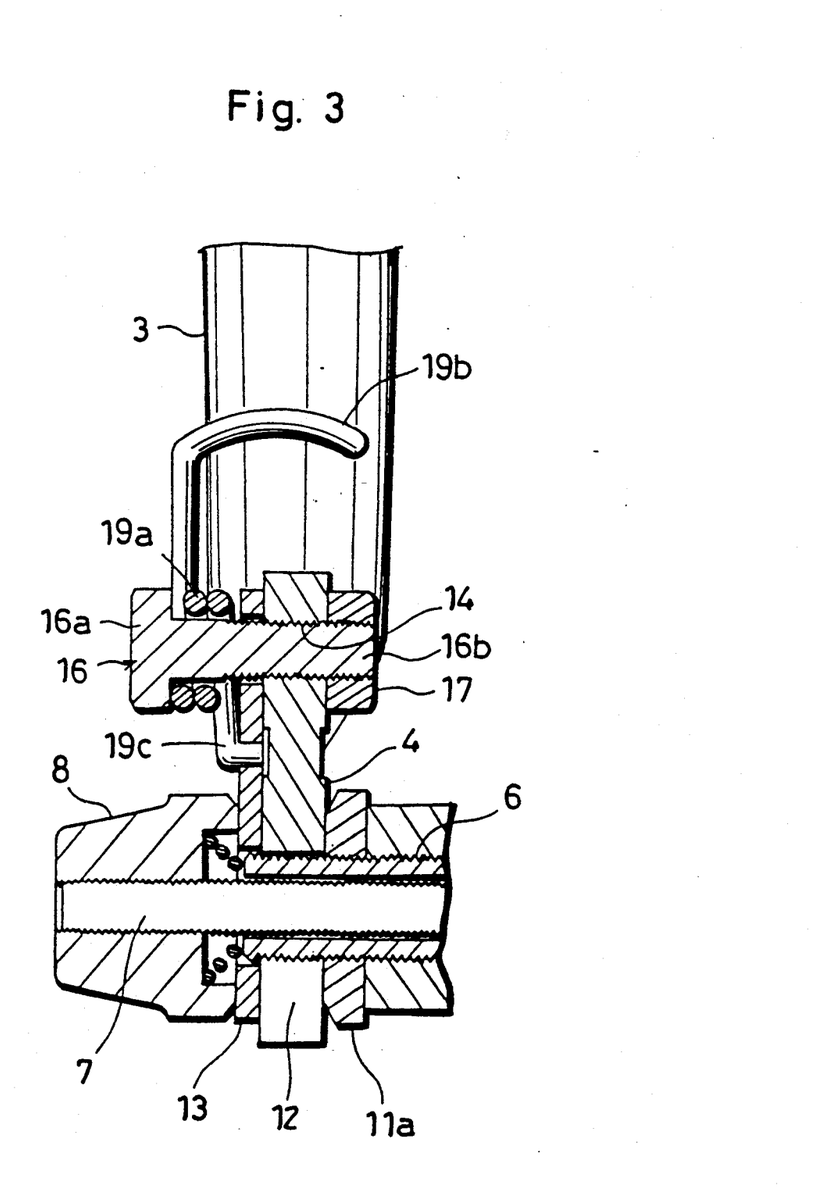
FIG. 3 is a sectional view taken on lines III—III in FIG. 2.

As shown in FIGS. 1 to 3, the hub assembly 1 comprises a hub shell 5, and a hollow hub shaft 6 for rotatably supporting the hub shell. Each end of the hub shaft 6 is received in a hub mounting cutout 12 (see also FIG. 4) of a corresponding fork end 4. The details of the hub assembly 1 itself are well known in the art and therefore not described further.

The quick-release type clamping assembly 2 forms a combined or integrated unit with the hub assembly 1 and is used for removably fixing the hub assembly to the respective fork ends 4. The clamping assembly 2 mainly includes a tie rod 7 extending through the hollow hub shaft 6 (see FIG. 3), an adjusting end nut 8 screwed to one end of the tie rod 7, a hollow presser member 10 slidably fitted on the other end of the tie rod 7, and a lever 9 for causing the presser member 10 to move axially toward and away from the end nut 8.

Associated with the adjusting end nut 8 is a first lock nut 11a which is screwed to one end of the hub shaft 6 with one fork end 4 interposed between the end nut and the first lock nut, as best shown in FIG. 3. Similarly, associated with the presser member 10 is a second lock nut 11b which is screwed to the other end of the hub shaft 6 with the other fork end 4 interposed between the presser member and the second lock nut (see FIG. 1). Thus, when the lever 9 is tightened up to reduce the distance between the end nut 8 and the presser member 10, the respective fork ends 4 are clamped between the end nut and the first lock nut as well as between the presser member and the second lock nut, thereby fixing the hub assembly 1 to the fork ends 4.

In the illustrated embodiment, the removal preventing mechanism comprises a pair of latch members 13 mounted to the respective fork ends 4. Both latch members 13 are identical in configuration and arrangement. Thus, the following description is made only with respect to one latch member.

According to the embodiment shown in FIGS. 1 to 5, each fork end 4 is shown to have two threaded holes 14, 15 (see FIGS. 2 and 3), and use is made of one threaded hole 14 for mounting the latch member 13 to the fork end 4. It should be appreciated that the fork end is a standardized part, so that it has the threaded holes even if they are left unused due to the purposes of the bicycle. It should be further noted that the threaded hole 14 is normally provided for fixing a luggage carrier leg, whereas the other threaded hole 15 is normally used for fixing a mudguard leg for example.

Specifically, a bolt 16 is screwed into the threaded hole 14 with its head 16a slightly spaced from the fork end 4 (see FIG. 3), and the latch member 13 is pivotally supported on the bolt shank 16b. Unexpected loosening of the bolt 16 is prevented by screwing a nut 17 onto the bolt shank 16b on the side of the fork end 4 away from the bolt head 16a.

Figure 4:
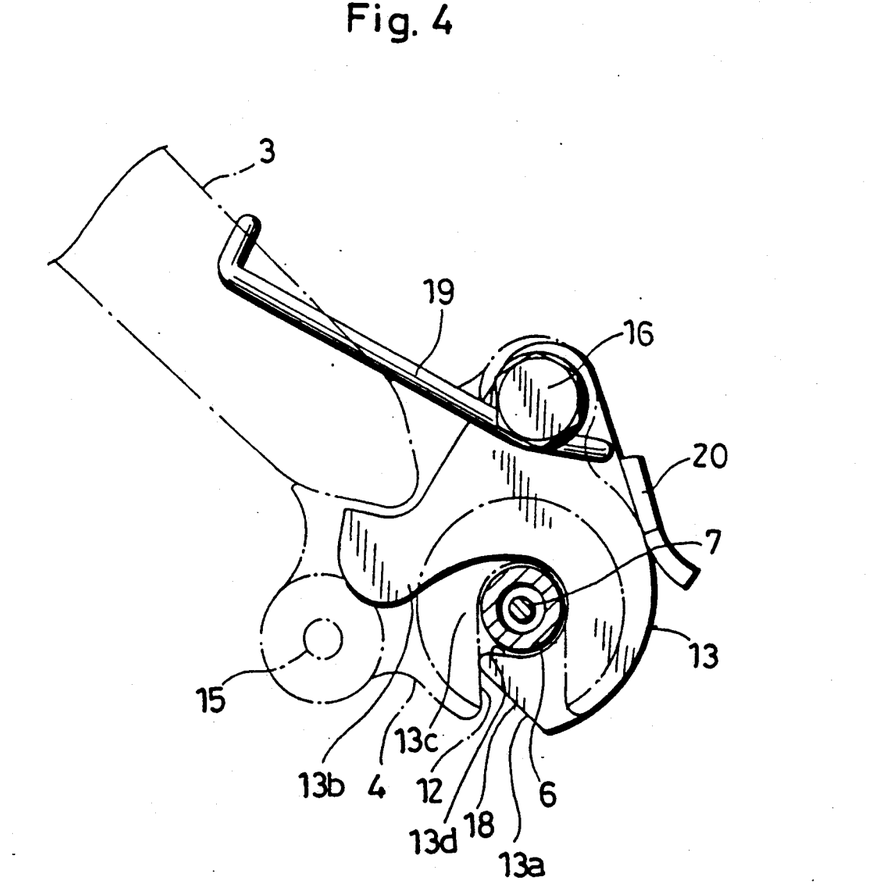
FIGS. 4 and 5 are schematic side views showing the operation of the removal preventing mechanism.
Figure 5:
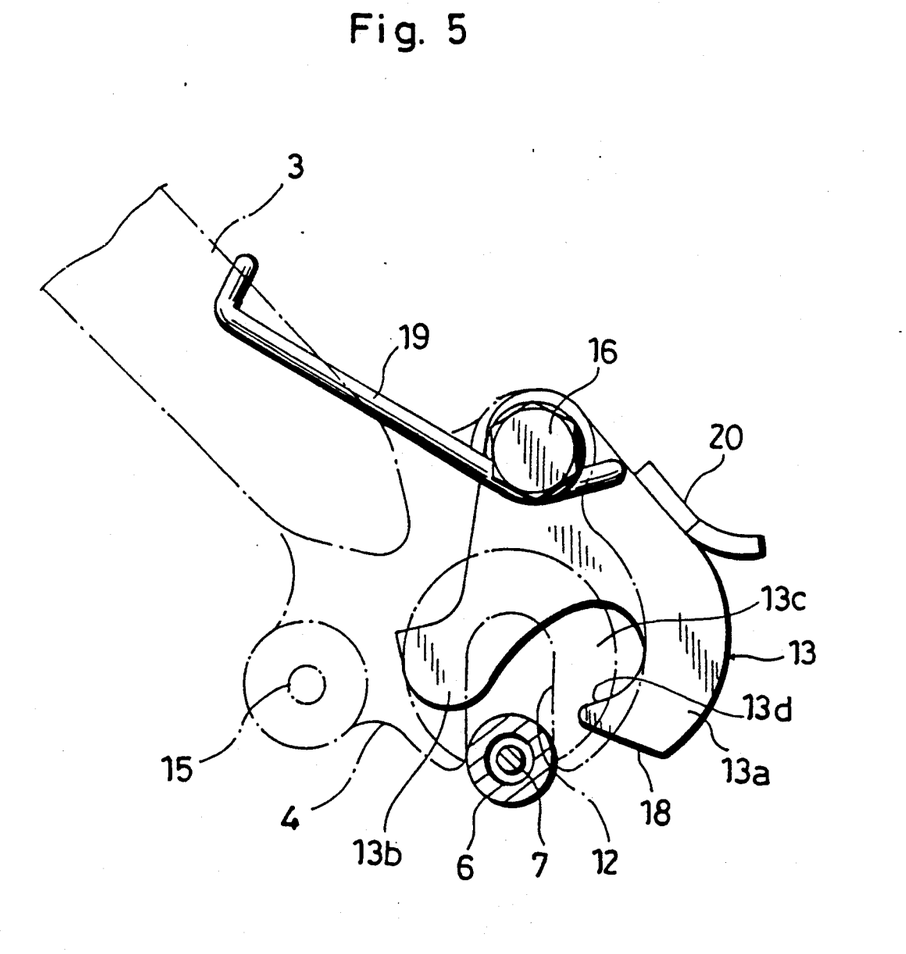

The latch member 13 is pivotally movable about the bolt 16 between a locking position shown in FIG. 4 and an unlocking position shown in FIG. 5. However, the latch member 13 is normally urged to the locking position of FIG. 4 by a spring 19. Specifically, as best shown in FIG. 3, the spring 19 has a coil portion 19a fitted on the bolt shank 16b, a first leg portion 19b engaging the corresponding fork 3, and a second leg portion 19c engaging the latch member 13.

As best shown in FIG. 4, the latch member 13 has a hook portion 13a and a shaft releasing portion 13b, and a latching cutout 13c is defined between the hook portion 13a and the shaft releasing portion 13b. Further, the hook portion 13a has an inner support edge 13d and an outer cam edge 18.

When the latch member 13 assumes the locking position shown in FIG. 4, the latching cutout 13c overlaps the hub mounting cutout 12 of the fork end 4 with the inner support edge 13d of the hook portion 13a traversing the hub mounting cutout 12 substantially at a right angle. Thus, even if the hub shaft 6 tends to move downward, the interaction between the hub shaft and the inner support edge 13d of the hook portion does not result in generation of a force component tending to pivot the latch member 13 in the unlocking direction. As a result, the hub shaft 6 (i.e., the hub assembly 1) is effectively prevented from unexpected removal as long as the latch member 13 assumes the locking position.

Conversely, when the latch member 13 is forcibly pivoted to the unlocking position of FIG. 5 against the spring 19 (counterclockwise in FIG. 5), the shaft releasing portion 13b of the latch member presses the hub shaft 6 downward to assist intended removal of the hub assembly 1. It should be appreciated that such removal of the hub assembly 1 is performed only when the lever 9 of the clamping assembly 2 is intentionally operated to relieve the previous clamping force for repair or replacement of the wheel.

For re-mounting the hub assembly 1, the hub shaft 6 need only be pressed upward for insertion in the hub mounting cutout 12 of the fork end 4. In this case, the outer cam edge 18 of the latch hook portion 13a interacts with the upwardly moving hub shaft 6, thereby causing the latch member 13 to pivot against the spring 19 in the unlocking direction (counterclockwise in FIGS. 4 and 5). Thus, the hub shaft 6 can be easily brought to its mounting position of FIG. 4, whereafter the latch member 13 spontaneously pivots to its locking position under the biasing force of the spring 19. The re-mounting of the hub assembly 1 is completed when the lever 9 of the clamping assembly 2 is operated for re-clamping.

Preferably, the latch member 13 is provided with an operating tongue 20 which, according to the illustrated embodiment, is formed by perpendicularly bending a portion of the latch member. The operating tongue 20 is manually operated for conveniently pivoting the latch member 13 to its unlocking position of FIG. 5. The tongue 20 also has an additional function of holding the latch member 13 in its locking position of FIG. 4 by coming into stopping engagement with the fork end 4 (see FIG. 4).

Alternatively, the operating tongue 20 may be omitted, and the latch member 13 may be manually pivoted in the unlocking direction by utilizing the cam edge 18 for example. Instead, the fork end 4 itself may be provided with a stopper (not shown) which comes into stopping engagement with the latch member 13 pivoted to the locking position of FIG. 4.

In the embodiment shown in FIGS. 1 to 5, the latch member 13 is disposed on the laterally outer side of the fork end 4, so that the latch member is interposed between the adjusting end nut 8 (or the presser member 10) and the fork end 4. However, the latch member 13 may be disposed on the laterally inner side of the fork end 4, so that the latch member is interposed between the lock nut 11a (or 11b) and the fork end 4, as shown in FIG. 6.

Figure 6:
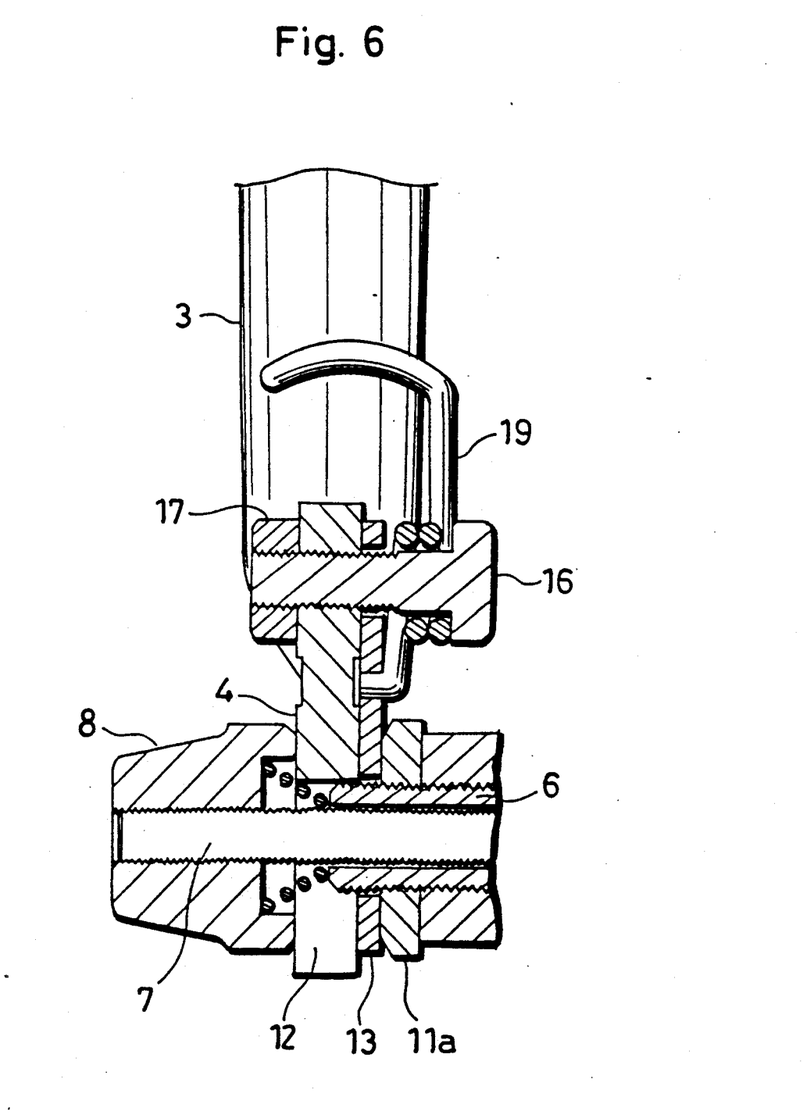
FIG. 6 is a sectional view similar to FIG. 3 but showing a slight modification from the arrangement of FIG. 3.
Figure 7:
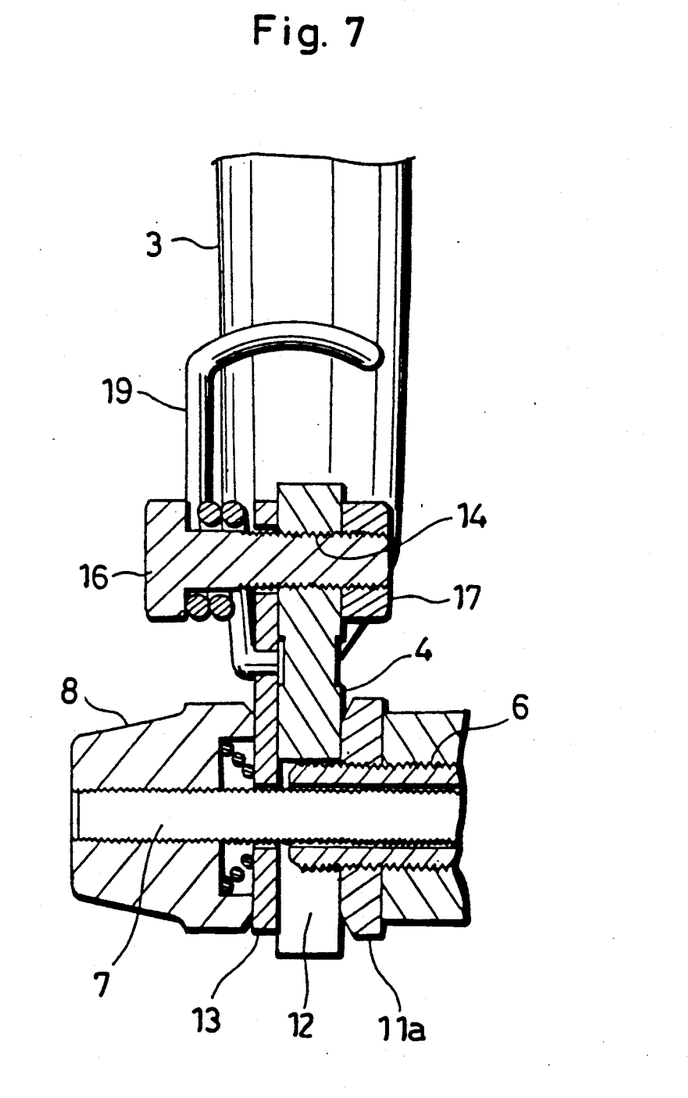
FIG. 7 is a sectional view also similar to FIG. 3 but showing another slight modification from the arrangement of FIG. 3.

Further, in the embodiment shown in FIGS. 1 to 5 (or FIG. 6), the latch member 13 in the locking position is made to directly engage the hub shaft 6 (see FIG. 3 or 6). However, the latch member 13 may be made to engage the tie rod 7 of the quick-release type clamping assembly 2, as shown in FIG. 7. In this case, the hub shaft 6 is slightly shorter than that illustrated in FIG. 3.

Figure 8:
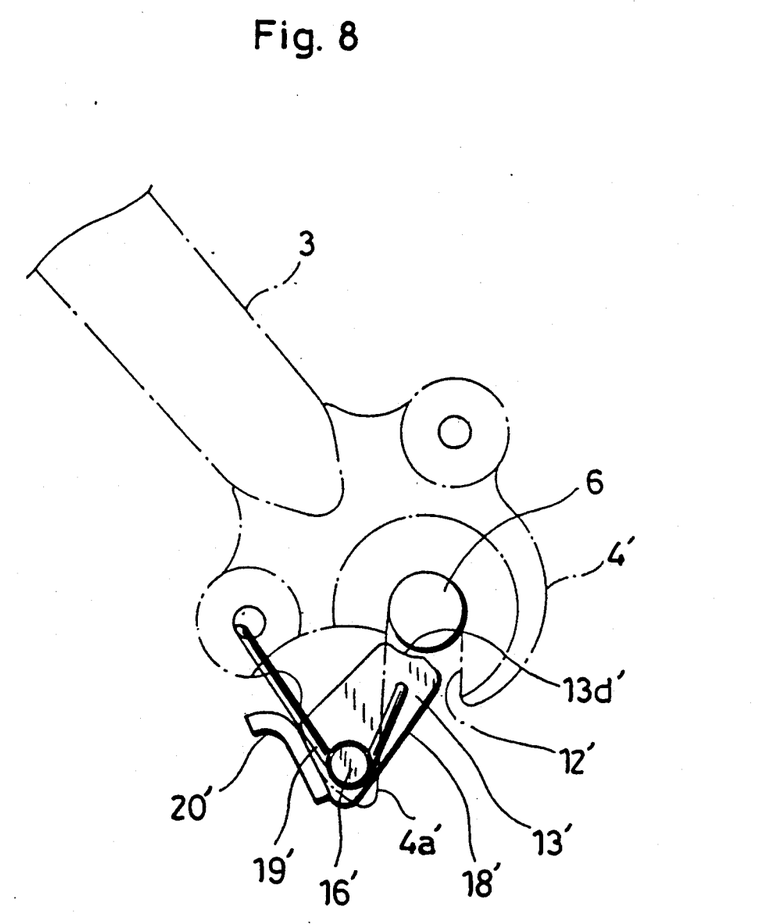
FIGS. 8 and 9 are schematic side views similar to FIGS. 4 and 5 but showing another removal preventing mechanism according to the present invention in two different positions.
Figure 9:
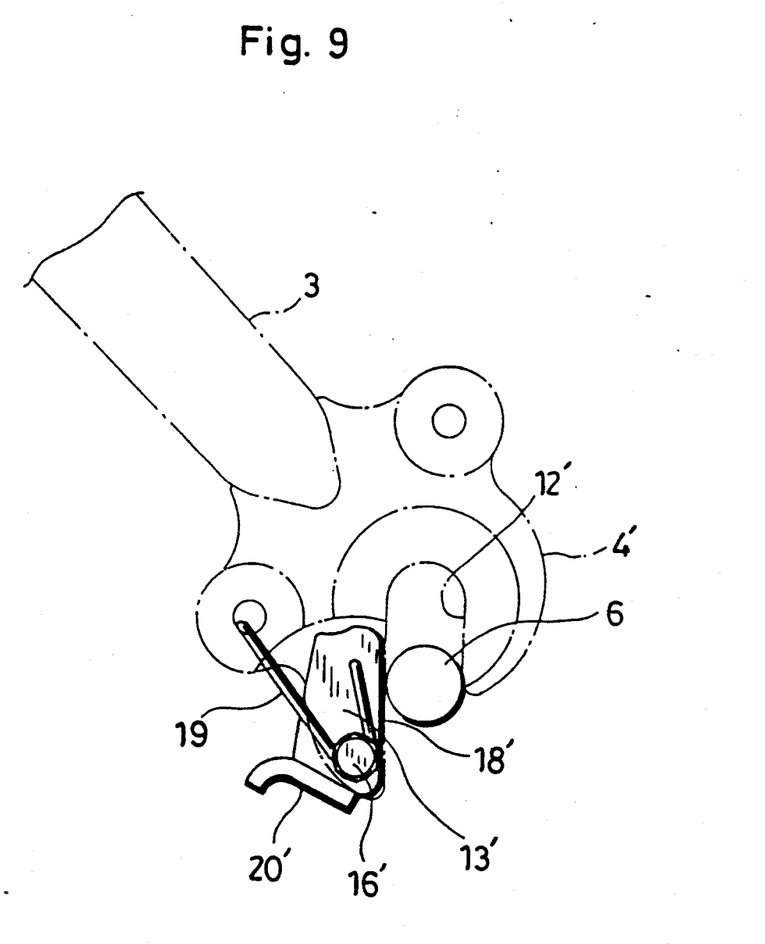

FIGS. 8 and 9 show another embodiment wherein each fork end 4' is made to have a longer downward extension 4a' on one side of a hub mounting cutout 12'. A removal preventing mechanism according to this embodiment comprises a modified latch member 13' which is pivotally supported at the downward extension 4a' by means of a bolt 16'.

The latch member 16' is pivotable about the bolt 16' between a locking position shown in FIG. 8 and an unlocking position shown in FIG. 9. Normally, the latch member 16' is pivotally urged to the locking position of FIG. 8 by a spring 19' fitted on the bolt 16'.

In the locking position shown in FIG. 8, the modified latch member 16', which is much simpler in configuration than that of the foregoing embodiment, extends obliquely upward into the hub mounting cutout 12' of the fork end 4'. The latch member has an upper support edge 13d' for preventing downward removal of the hub shaft 6. Further, the latch member has a cam edge 18' which interacts with the hub shaft 6 to pivot the latch member in the unlocking direction at the time of mounting or re-mounting the hub shaft (i.e. the hub assembly) to the fork end 4'.

Moreover, the latch member 13' is provided with an operating tongue 20' which is formed by perpendicularly bending a portion of the latch member. When the latch member assumes the locking position of FIG. 8, the tongue 20' comes into stopping engagement with the downward extension 4a' of the fork end 4'. Obviously, when the hub shaft 6 tends to move downward, a force is generated which tends to pivot the latch member clockwise in FIG. 8. However, such pivotal movement is prevented by engagement between the tongue 20' and the fork end 4', so that the hub shaft (i.e. hub assembly as a whole) is reliably prevented from unexpected removal.

On the other hand, the operating tongue 20' may be also utilized for forcibly pivoting the latch member 13' to the unlocking position of FIG. 9. In this position, the latch member becomes substantially upright to fully open the hub mounting cutout 12', so that the hub shaft 6 (i.e., the hub assembly) can be completely removed off the fork end 4' to enable repair or replacement of the wheel.

Obviously, the modified latch member 13' may be arranged either on the laterally outer side of the fork end 4' (similarly to FIG. 3) or on the laterally inner side of the fork end (similarly to FIG. 6). Further, the latch member may be made to engage or support the tie rod 7 of the quick-release type clamping assembly 1 (see FIGS. 1 and 3) instead of the hub shaft 6.

According to the present invention, the hub assembly or wheel can be reliably prevented from unexpected or accidental removal even if the quick-release type clamping assembly is unexpectedly loosened for some reason. Such hub removal prevention is particularly advantageous for off-road bicycles such as mountain bicycles which are subjected to higher chance of wheel removal. On the other hand, due to the provision of the cam edge 18 (18'), the latch member 13 (13') is readily openable for insertion of the hub shaft 6 into the hub mounting cutout 12 (12') of the fork end 4 (4'). Thus, the presence of the latch member does not hinder mounting or re-mounting of the hub assembly.

The invention being thus described, it is obvious that the same may be varied in many ways. For instance, the removal preventing mechanism may comprise only a single latch member associated with one of the fork ends. Further, the removal preventing mechanism according t the present invention may be applied to a hub assembly without a quick-release type clamping assembly. Such variations are not to be regarded as a departure from the spirit and scope of the invention, and all such modifications as would be obvious to those skilled in the art are intended to be included within the scope of the following claims.

We claim:

1. A removal preventing mechanism for preventing unexpected removal of a bicycle hub assembly from a pair of fork ends each having a hub mounting cutout, the hub assembly including a hub shaft which is received in the hub mounting cutout of each fork end, the removal preventing mechanism comprising:

a latch member pivotally mounted to at least one fork end, the latch member being pivotable between a locking position for preventing removal movement of the hub shaft from the hub mounting cutout of said one fork end and an unlocking position or allowing movement of the hub shaft from and into the hub mounting cutout of said fork end; and biasing means for normally urging the latch member to the locking position, wherein the latch member has a cam edge which interacts with the hub shaft for forcibly pivoting the latch member out of the locking position when the hub shaft enters into the hub mounting cutout of said one fork end.

2. The removal preventing mechanism according to claim 1, further comprising means for stopping the latch member at the locking position even under the action of the biasing means.

3. The removal preventing mechanism according to claim 1, wherein the latch member is provided with an operating portion which is used for manually pivoting the latch member to the unlocking position against the action of the biasing means.

4. The removal preventing mechanism according to claim 3, wherein the operating portion of the latch member is formed by perpendicularly bending a portion of the latch member.

5. The removal preventing mechanism according to claim 3, wherein the operating portion of the latch member is made to engage said one fork end for stopping the latch member at the locking position.

6. The removal preventing mechanism according to claim 1, wherein the latch member is arranged on a laterally outer side of said one fork end.

7. The removal preventing mechanism according to claim 1, wherein the latch member is arranged on a laterally inner side of said fork end.

8. The removal preventing mechanism according to claim 1, wherein the latch member in the locking position is made to directly engage the hub shaft for preventing unexpected removal thereof from the hub mounting cutout of said one fork end.

9. The removal preventing mechanism according to claim 1, wherein the hub shaft is hollow and penetrated by a tie rod, the latch member in the locking position being made to engage the tie rod for indirectly preventing unexpected removal of the hub shaft from the hub mounting cutout of said one fork end.

10. The removal preventing mechanism according to claim 1, wherein the latch member is pivotally supported by a bolt screwed to said one fork end.

11. The removal preventing mechanism according to claim 10, wherein the bolt is screwed into a threaded hole preformed in said one fork end above the hub mounting cutout thereof, the latch member being pivotally suspended from the bolt.

12. The removal preventing mechanism according to claim 11, wherein the latch member has a hook portion and a shaft releasing portion with a latching cutout formed therebetween, the hook portion traversing the hub mounting cutout of said one fork end when the latch member assumes the locking position, the hook portion being located clear of the hub mounting cutout when the latch member assumes the unlocking position, the shaft releasing portion being located clear of the hub mounting cutout when the latch member assumes the locking position, the shaft releasing portion overlapping the hub mounting cutout for pressing the hub shaft when the latch member assumes the unlocking position.

13. The removal preventing mechanism according to claim 12, wherein the hook portion of the latch member has an inner support edge which extends substantially at a right angle relative to the hub mounting cutout of said one fork end when the latch member assumes the locking position.

14. The removal preventing mechanism according to claim 10, wherein said one fork end has a downward extension to which the bolt is screwed-, the latch member extending upward from the bolt, the latch member overlapping the hub mounting cutout of said one fork end when the latch member assumes the locking position, the latch member being located clear of the hub mounting cutout when the latch member assumes the unlocking position.

15. A removal preventing mechanism for preventing unexpected removal of a bicycle hub assembly from a pair of fork ends each having a hub mounting cutout, the hub assembly including a hub shaft which is received in the hub mounting cutout of each fork end, the removal preventing mechanism comprising:

a latch member pivotally mounted to at least one fork end, the latch member being pivotable between a locking position for preventing removal movement of the hub shaft from the hub mounting cutout of said one fork end and an unlocking position for allowing movement of the hub shaft from and into the hub mounting cutout of said fork end; and biasing means for normally urging the latch member to the locking position, wherein the latch member is pivotally supported by a bolt screwed to said one fork end, wherein the bolt is screwed into a threaded hole preformed in said one fork end above the hub mounting cutout thereof, the latch member being pivotally suspended from the bolt, wherein the latch member has a hook portion and a shaft releasing portion with a latching cutout formed therebetween, the hook portion traversing the hub mounting cutout of said one fork end when the latch member assumes the locking position, the hook portion being located clear of the hub mounting cutout when the latch member assumes the unlocking position, the shaft releasing portion being located clear of the hub mounting cutout when the latch member assumes the locking position, the shaft releasing portion overlapping the hub mounting cutout for pressing the hub shaft when the latch member assumes the unlocking position.

16. The removal preventing mechanism according to claim 15, wherein the hook portion of the latch member has an inner support edge which extends substantially at a right angle relative to the hub mounting cutout of said one fork end when the latch member assumes the locking position.

* * * * *